United States Patent
Doi (10) Patent No.: US 10,044,889 B1
(45) Date of Patent: Aug. 7, 2018

(54) IMAGE FORMING APPARATUS AND IMAGE FORMING METHOD

(71) Applicants: KABUSHIKI KAISHA TOSHIBA, Tokyo (JP); TOSHIBA TEC KABUSHIKI KAISHA, Tokyo (JP)

(72) Inventor: Yayoi Doi, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/685,841

(22) Filed: Aug. 24, 2017

(51) Int. Cl.
  *H04N 1/00* (2006.01)
  *B65H 7/04* (2006.01)
  *B65H 7/20* (2006.01)

(52) U.S. Cl.
  CPC ........... *H04N 1/00726* (2013.01); *B65H 7/04* (2013.01); *H04N 1/00068* (2013.01); *B65H 7/20* (2013.01); *G03G 2221/1823* (2013.01); *H04N 2201/0094* (2013.01)

(58) Field of Classification Search
  CPC ........... H04N 1/00726; H04N 1/00068; H04N 2201/0094; B65H 7/04; B65H 7/20; G03G 2221/1823
  See application file for complete search history.

(56) References Cited

U.S. PATENT DOCUMENTS

2009/0015877 A1* 1/2009 Connors ............ G03G 15/5087
                                                         358/443
2011/0019224 A1* 1/2011 Austin ............... H04N 1/00005
                                                         358/1.15

FOREIGN PATENT DOCUMENTS

JP  2016-183010  10/2016

* cited by examiner

*Primary Examiner* — Kent Yip
(74) *Attorney, Agent, or Firm* — Patterson & Sheridan, LLP (57) ABSTRACT

A sheet processing apparatus according to an embodiment includes an image reading unit that reads an image of a sheet. A sheet discharge tray receives a sheet read by the image reading unit. A measurement unit measures a total weight of sheets on the sheet discharge tray. A read counter counts a number of all sheets read by the image reading unit. The read counter stores the number of the currently read sheet in association with the measured total weight of the sheets on the sheet discharge tray. A measured value comparison unit compares the current measured weight of the sheets and a stored measured weight stored in association with the number of the read sheet immediately preceding the currently read sheet. A dropped page identification unit identifies, by page number, one or more sheets dropped from the sheet discharge unit based on the comparison result.

20 Claims, 8 Drawing Sheets

IMAGE FORMING APPARATUS AND IMAGE FORMING METHOD

FIELD

Embodiments described herein relate generally to an image forming apparatus and an image forming method.

BACKGROUND

In an image forming apparatus such as machine multi-function peripheral (MFP), a discharge speed of a sheet increases as a result of increased scanning speed. Thus, after discharging, the sheets may be uneven or dropped onto a floor without being contained in the sheet discharge tray. Therefore, when a large amount of documents are scanned, a user must take time to align the sheets. In addition, when one or more sheets drop, it may be difficult to return the sheets to an original page order. There is also a case where sometimes a part of the sheet is lost because a user did not notice the drop.

In order to prevent the sheet discharged after scanning from dropping, a shape of a sheet discharge tray may be altered. However, although it is possible to suppress dropping of the sheet, the problem related to dropping of the sheet after the scanning cannot be satisfactorily solved.

DETAILED DESCRIPTION

A sheet processing apparatus according to an embodiment includes an image reading unit that reads an image of a sheet. A sheet discharge tray receives a sheet read by the image reading unit. A measurement unit measures a total weight of one or more sheets on the sheet discharge tray. A read counter counts, for each currently read sheet, a number of all sheets, including the currently read sheet, read by the image reading unit in a scanning job. The read counter stores in a storage unit the number of the currently read sheet in association with the measured total weight of the sheets, including the currently read by the image reading unit, on the sheet discharge tray. A measured value comparison unit compares the current measured weight of the sheets on the sheet discharge tray and a stored measured weight stored in association with the number of the read sheet immediately preceding the currently read sheet. A dropped page identification unit identifies, by page number, one or more sheets dropped from the sheet discharge unit based on the comparison result.

Figure 1:
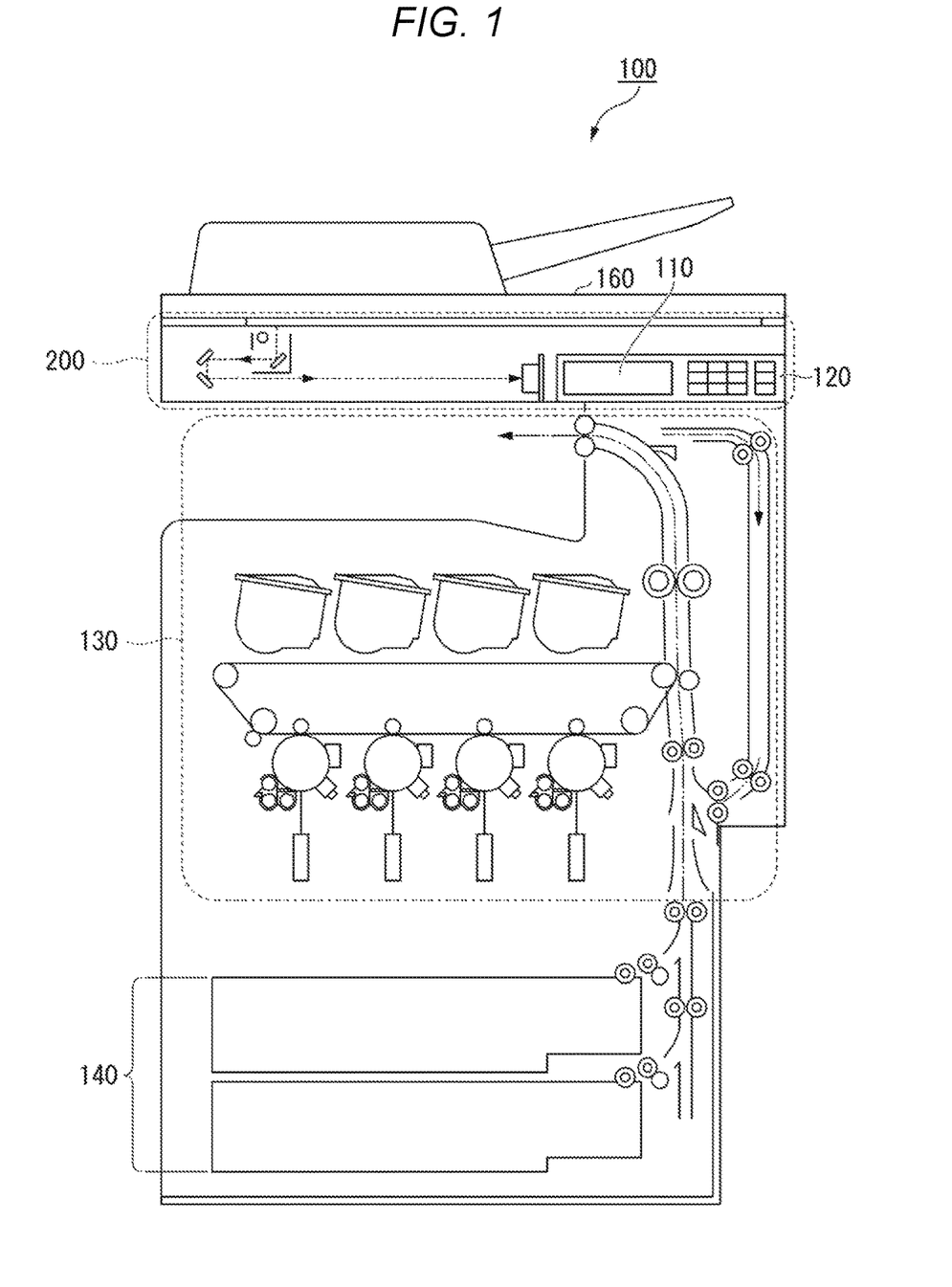
FIG. 1 is an external view showing an example configuration of an image forming apparatus according to an embodiment.

FIG. 1 is an external view showing an example configuration of image forming apparatus 100 according to the embodiment. For example, image forming apparatus 100 is an MFP. The image forming apparatus 100 includes a display 110, a control panel 120, a printer 130, a sheet accommodation unit 140 (e.g., a sheet tray), a sheet discharge unit 160, and an image reading unit 200. In one embodiment, an image reading unit 200 is a scanner, e.g., a CCD image sensor, CMOS image sensor, or contact image sensor, and the sheet discharge unit 160 is a tray for receiving the sheet read by the image reading unit 200. The sheet discharge unit 160 includes a weight sensor to measure the weight of sheets. The weight sensor may be load cell type or electrostatic capacitance type.

The image forming apparatus 100 forms an image on a sheet by using, for example, a developer such as a toner. The sheet may be, for example, a paper or a label paper. The sheet may be anything as long as the image forming apparatus 100 can form an image on a surface of the sheet.

The display 110 is an image display device such as a liquid crystal display and an organic electro luminescence (EL) display. The display 110 displays various pieces of information relating to the image forming apparatus 100. The display 110 is an example of a display unit.

The control panel 120 includes a plurality of buttons. The control panel 120 receives a user's operation. The control panel 120 outputs a signal according to an operation performed by the user with respect to a control unit of the image forming apparatus 100. The display 110 and the control panel 120 may be provided together as an integrated touch panel.

The printer 130 forms an image on the sheet based on image information generated by the image reading unit 200 or image information received through a communication path. For example, the printer 130 forms an image by the following process. An image forming unit of the printer 130 forms an electrostatic latent image on a photosensitive drum based on the image information. The image forming unit of the printer 130 forms a visible image by applying the developer to the electrostatic latent image. As a specific example of the developer, toner may be used. A transfer unit of the printer 130 transfers the visible image onto the sheet. A fixing unit of the printer 130 fixes the visible image on the sheet by applying heat and pressure with respect to the sheet. The sheet on which the image is formed may be the sheet accommodated in the sheet accommodation unit 140, or may be a manually fed sheet.

The sheet accommodation unit 140 accommodates sheets used for image formation in the printer 130.

The sheet discharge unit 160 discharges the sheet from which the image is read by the image reading unit 200.

The image reading unit 200 reads the image information of a read target based on brightness and darkness of light. The image reading unit 200 records the read image information. The recorded image information may be transmitted to another information processing apparatus through a network. The recorded image information may be used to form an image on the sheet by the printer 130.

Figure 2:
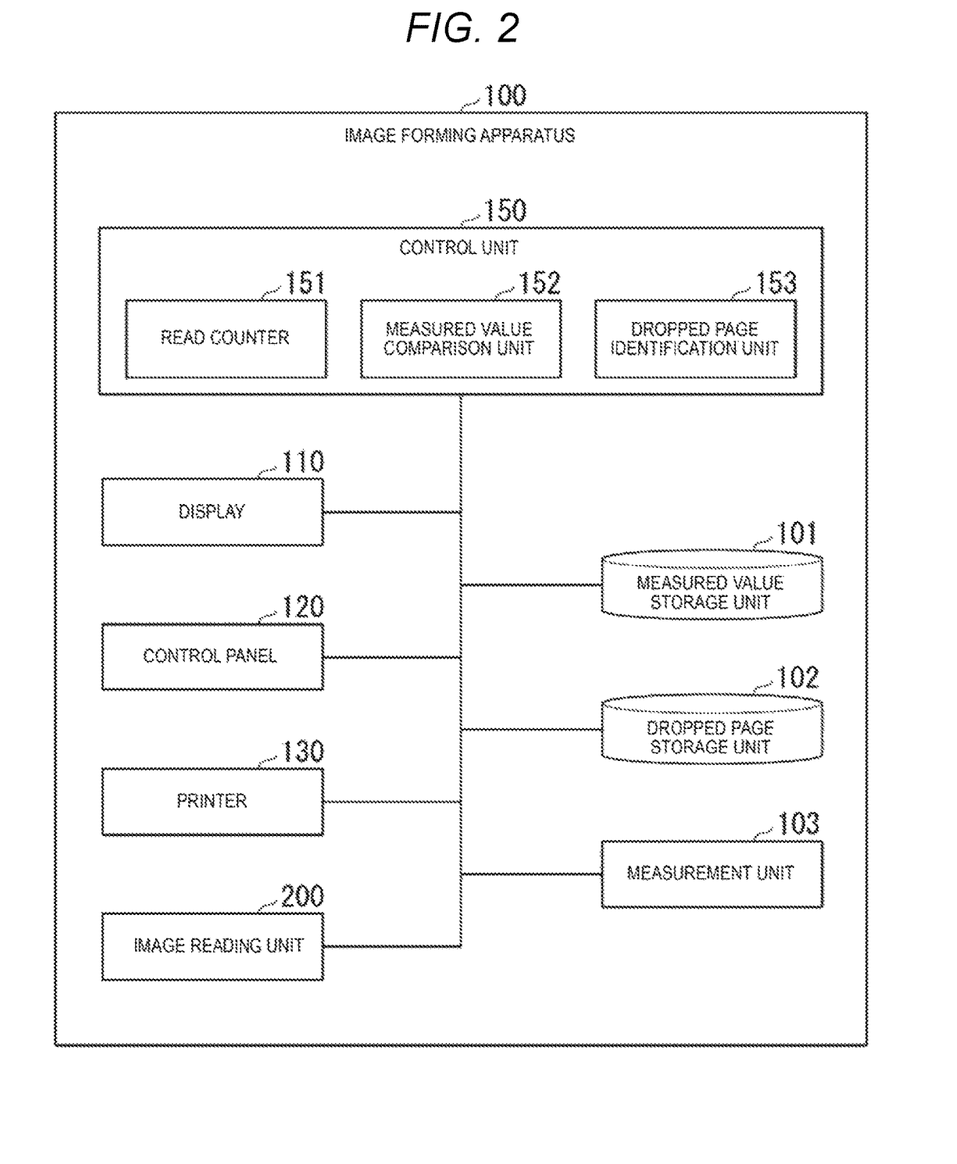
FIG. 2 is a block diagram indicating an example functional configuration of the image forming apparatus.

FIG. 2 is a block diagram indicating an example functional configuration of the image forming apparatus of the embodiment. The image forming apparatus 100 includes a measured value storage unit 101, a dropped page storage unit 102, a measurement unit 103 (e.g., a weight sensor), a display 110, a control panel 120, a printer 130, a control unit 150, and the image reading unit 200.

The measured value storage unit 101 may be included in a storage device such as a magnetic hard disk device or a semiconductor storage device. The measured value storage unit 101 associates the number of the current read sheet with a corresponding measured value of the $1^{st}$ through current sheets which have been read during the scanning operation, and stores an associated result. The measured value storage unit 101 stores each of the read sheet numbers and the corresponding measured value. Whenever a sheet is read, the measured value storage unit 101 stores the number of the read sheet and the corresponding measured value. Hereinafter, the measured values stored in the measured value storage unit 101 are each referred to as a "stored measured value." Similarly, the measured value corresponding to the currently read sheet is referred to as a "currently measured value."

The number of the read sheet corresponds to the total number of sheets which have so far been read by the image reading unit 200. The number of read sheets is counted by a read counter 151. The measured value is a cumulative weight of the sheets that are discharged to a sheet discharge tray (not shown). The measured value is measured by the measurement unit 103 each time one of the sheets is read. The scanned sheet is discharged to the sheet discharge tray. The sheet discharge tray is an example of the sheet discharge unit.

The dropped page storage unit 102 may be included in the storage device such as the magnetic hard disk device and the semiconductor storage device. The dropped page storage unit 102 stores a page number of the sheet that is dropped from the sheet discharge tray from among the sheets discharged after reading the image. When multiple sheets drop, the dropped page storage unit 102 stores a plurality of page numbers.

The measurement unit 103 may be a weight measuring device such as a weight sensor. The measurement unit 103 measures a weight on the sheet discharge tray. The measurement unit 103 is attached to the sheet discharge tray of the image forming apparatus 100. The read counter 151 stores the measured value (i.e., the weight) measured by the measurement unit 103 in the measured value storage unit 101 in association with the corresponding (ordinal) number of the read sheet.

The control unit 150 controls an operation of each unit of the image forming apparatus 100. For example, the control unit 150 is operated by a device in which a central processing unit (CPU) and a random access memory (RAM) are included. In one embodiment, the control unit 150 is programmed to function as the read counter 151, a measured value comparison unit 152, and a dropped page identification unit 153. The flow of the programs executed by the control unit 150 corresponding to the read counter 151, the measured value comparison unit 152, and the dropped page identification unit 153 is further described below.

The read counter 151 counts the number of sheets read by the image reading unit 200 during the scanning. The number of read sheets indicates a page number (i.e., the ordinal number) of the sheet. The read counter 151 associates the number of read sheets with the corresponding measured value one by one, and stores the associated result in the measured value storage unit 101. In addition, when it is determined that one of the read sheets drops from the sheet discharge tray, the read counter 151 stores the (ordinal) number of the dropped sheet (s) in the dropped page storage unit 102. The read counter 151 outputs the number of the read sheet to the measured value comparison unit 152 or the dropped page identification unit 153 according to a request from the measured value comparison unit 152 or the dropped page identification unit 153.

The measured value comparison unit 152 compares the stored and current measured values. Specifically, the measured value comparison unit 152 compares the stored measured value associated with the number of the previously read sheet with the current measured value. As a comparison result, when the current measured value is not greater than the stored measured value corresponding to the previously read sheet, the measured value comparison unit 152 determines that the read sheet is dropped. Furthermore, as the comparison result, when the current measured value is smaller than the stored measured value corresponding to the previously read sheet, it is determined that the sheet already placed on the sheet discharge tray and the currently read sheet are both dropped together. In addition, when the current measured value is smaller than the stored measured value corresponding to the previously read sheet, the measured value comparison unit 152 compares the stored measured value of the number of the next previously read sheet with the currently measured value. The measured value comparison unit 152 obtains the stored measured value of the number of the next previously read sheet from the measured value storage unit 101 and compares it to the current measured value. The process—comparing the current measured value to the stored measured value of the next previous read sheet—repeats until the current measured value and the stored measured value coincide with each other.

The dropped page identification unit 153 identifies one or more dropped pages indicating a page number of the dropped sheet (s) among the sheets placed on the sheet discharge tray. Specifically, when it is determined that a sheet which is already placed on the sheet discharge tray and the read sheet are dropped together, the dropped page identification unit 153 determines the number of dropped sheets. The number of dropped sheets indicates the number of sheets dropped together, including the read sheet and dropped sheets that were already placed on the sheet discharge tray. The dropped page identification unit 153 determines a value by subtracting the number of dropped sheets from the number of the currently read sheet as the page number of the dropped sheet. The dropped page identification unit 153 stores the page number(s) of the dropped sheet in the dropped page storage unit 102. The dropped page identification unit 153 counts the number of dropped sheets until the current measured value and the stored measured value coincide with each other, in incremental steps similar to that described above with respect to the measured value comparison unit 152. Accordingly, the page number of the dropped sheet is stored in the dropped page storage unit 102. The number of dropped sheets is a counted value.

Figure 3:
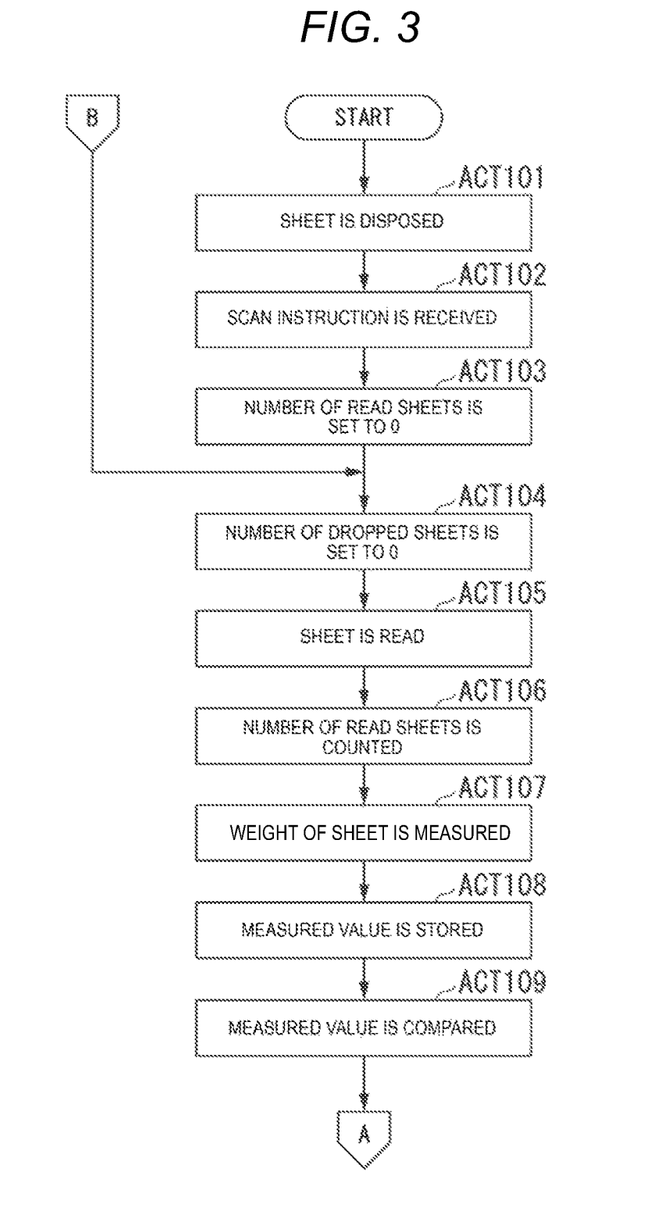
FIG. 3 is a flowchart indicating an example sequence of operations of an image read process.
Figure 4:
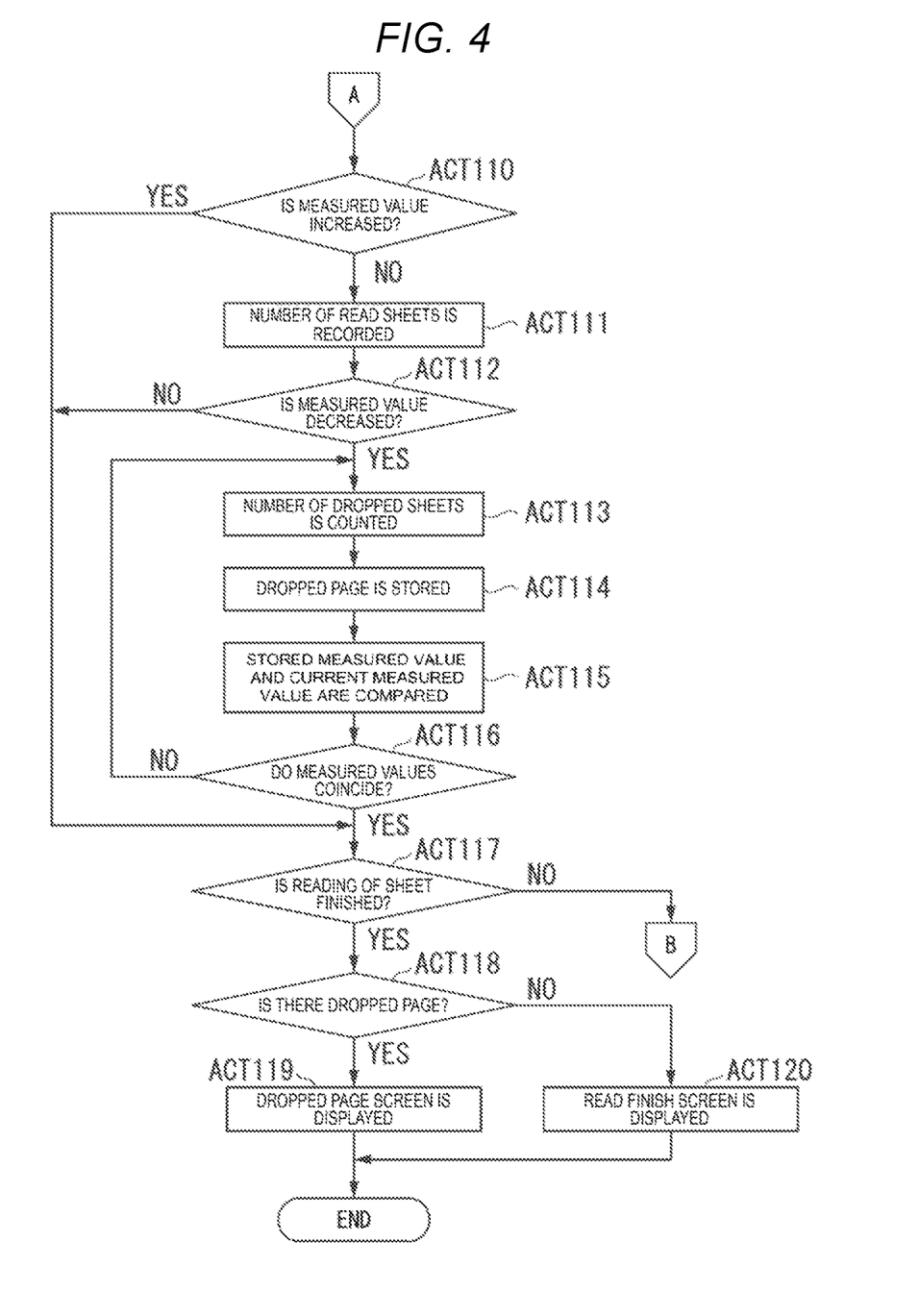
FIG. 4 is a flowchart indicating an example sequence of operations of an image read process.

FIG. 3 and FIG. 4 are flowcharts indicating an example sequence of operations of an image read process in the image forming apparatus of the embodiment. The sheet is disposed in a document feeder (DF) of the image reading unit 200 (Act 101). The control panel 120 receives a scan instruction from a user (Act 102). The read counter 151 sets the number of read sheets to 0 (Act 103). The dropped page identification unit 153 sets the number of dropped sheets to 0 (Act 104).

The image reading unit 200 reads the sheet disposed in the DF (Act 105). Whenever a sheet is read, the read counter 151 increments the number of read sheets by one (Act 106). Whenever one sheet is read and the read sheet is discharged to the sheet discharge tray, the measurement unit 103 determines the current measured weight value (e.g., weight) of all sheets on the sheet discharge tray (Act 107). The read counter 151 associates the number of read sheets counted in Act 106 with the measured value measured in Act 107, and stores the associated result in the measured value storage unit 101 (Act 108). Specifically, for example, when the image reading unit 200 reads the second sheet, the read counter 151 associates a value of the total number of the read sheets (in this case, two) with a measured value (e.g., weight) when the second sheet is discharged onto the sheet discharge tray, and stores the associated result in the measured value storage unit 101. The measured value comparison unit 152 compares the current measured value measured in Act 107 and the stored measured value associated with the number of the previously read sheet, i.e., the number of the currently read sheet minus one (Act 109).

The measured value comparison unit 152 determines whether or not the measured value is increased (Act 110). When it is determined that the measured value is increased (Act 110: YES), the process transitions to Act 117. When it is determined that the measured value is not increased (Act 110: NO), the read counter 151 stores the number of the read sheets in the dropped page storage unit 102 (Act 111). That is, in Act 111, since the measured value is not increased, it is determined that the read sheet is dropped, the number of read sheets (which is the page number of the currently read sheet) is stored in the dropped page storage unit 102.

The measured value comparison unit 152 determines whether or not the measured value is decreased (Act 112). When it is determined that the measured value is decreased (Act 112: NO), the process transitions to Act 117. When it is determined that the measured value is decreased (Act 112: YES), the dropped page identification unit 153 counts the number of dropped sheets up by one (Act 113). The dropped page identification unit 153 stores the page number of the dropped sheet in the dropped page storage unit 102 (Act 114).

The measured value comparison unit 152 subtracts the number of dropped sheets from the number of read sheets stored in the measured value storage unit 101. The measured value comparison unit 152 identifies the number of the read sheet (s) which coincides with the subtracted value. The stored measured value corresponding to the identified number of read sheets and the current measured value are compared with each other (Act 115).

The measured value comparison unit 152 determines whether or not the stored measured value and the current measured value coincide with each other (Act 116). When the measured values do not coincide with each other (Act 116: NO), the process transitions to Act 113. In other words, the measured value comparison unit 152 compares the current measured value with preceding stored measured values, one by one in order from the immediately preceding stored measured value, to the previously preceding (e.g., the "next" preceding) stored measured value, until the current measured value coincides with one of the preceding stored measured values.

When the measured values coincide with each other (Act 116: YES), the image reading unit 200 determines whether or not reading of the sheet is finished (Act 117). When the reading of the sheet is not finished (Act 117: NO), the process transitions to Act 104.

When the reading of the sheet is finished (Act 118: YES), the control unit 150 determines whether or not a page number of a dropped sheet is stored in the dropped page storage unit 102 (Act 118). When at least one page number of a dropped sheet is stored (Act 118: YES), the display 110 displays a dropped page screen including the page number of the dropped sheet (Act 119). When a page number of a dropped sheet is not stored (Act 118: NO), the display 110 displays a reading finished screen (Act 120).

Figure 5:
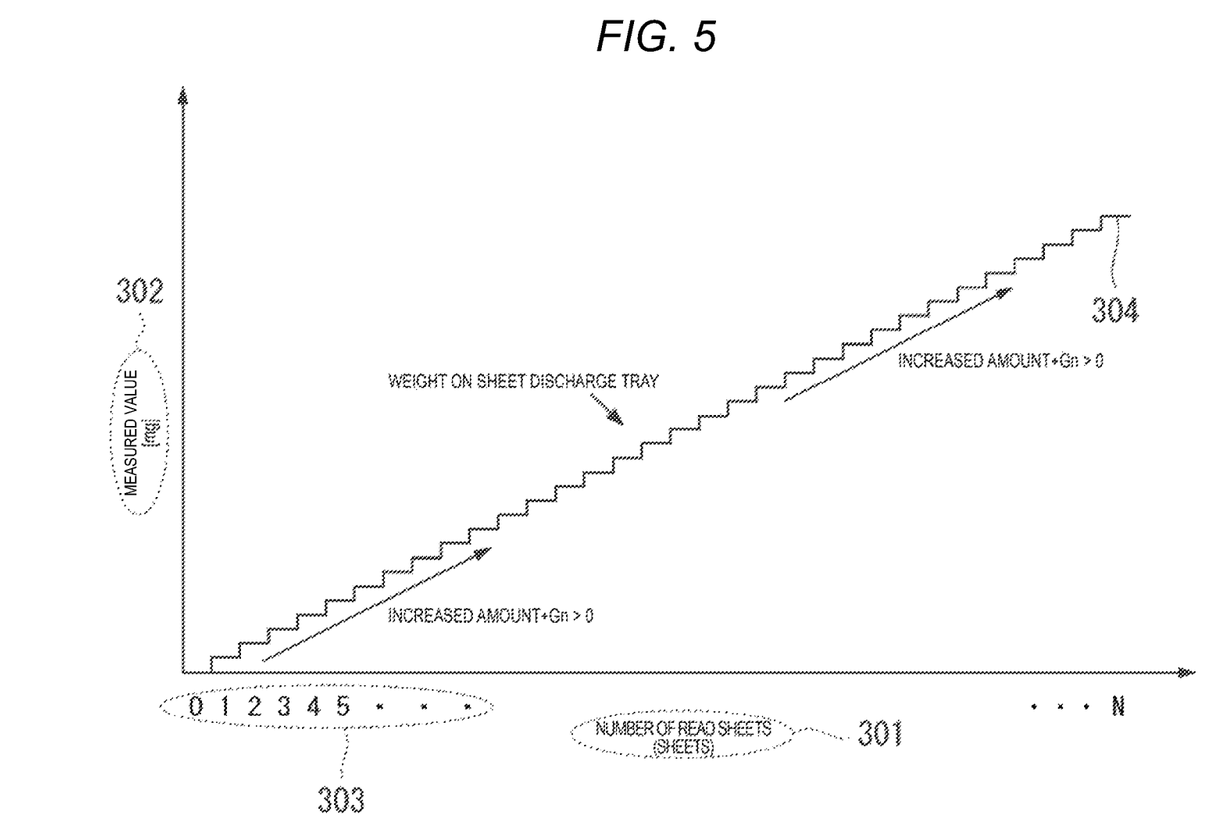
FIG. 5 is a graph indicating a change of a measuring value when scanning is normally progressed.

FIG. 5 is a graph indicating a change of the measured value as scanning is normally progressed in the embodiment. The graph of FIG. 5 includes a region 301, a region 302, a region 303, and a region 304. The region 301 indicates an item name on a horizontal axis of the graph. According to the region 301, the item name is the "number of read sheets (sheets)". The "number of read sheets (sheets)" indicates the number of read sheets counted by the read counter 151. The "number of read sheets (sheets)" increases in a direction indicated by an arrow. The region 302 indicates an item name on a vertical axis of the graph. According to the region 302, the item name is a "measured value [mg]". The "measured value [mg]" indicates a measured value measured by the measurement unit 103. The "measured value [mg]" increases in the direction indicated by an arrow. The region 303 indicates increments of the number of scanned sheets. The region 304 is a line indicating a relationship between the number of read sheets (sheets) and the corresponding measured value [mg]. According to the region 304, when image reading normally progresses, as the number of read sheets (sheets) is increased, the measured value [mg] is also increased.

Figure 6:
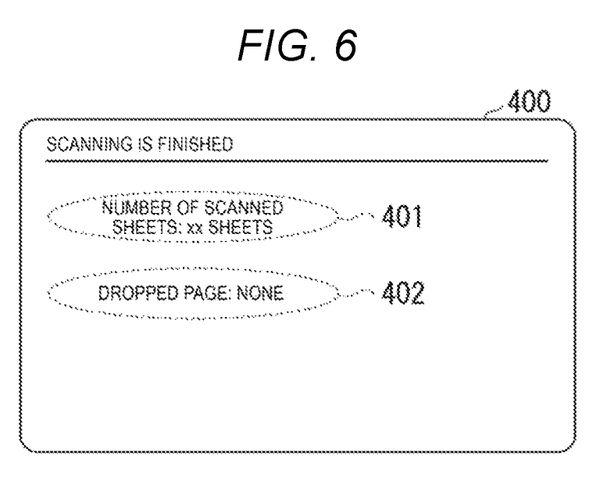
FIG. 6 is an example of an image displayed on a display when the scanning is normally finished.

FIG. 6 is a diagram indicating a specific example of the reading finished screen displayed on a display when the scanning of the embodiment is normally finished. A region 400 indicates an image displayed on the display 110. The region 400 includes a region 401 and a region 402. The number of read sheets scanned by the image reading unit 200 is displayed on the region 401. For the number of read sheets, a value counted by the read counter 151 is used. According to the region 401, it is understood that xx sheets are read. The number of sheets dropped from the sheet discharge tray during the scanning is displayed on the region 402. For the number of sheets, the number of the dropped pages stored in the dropped page storage unit 102 is used. According to the region 402, it is understood that there are no sheets dropped from the sheet discharge tray.

Figure 7:
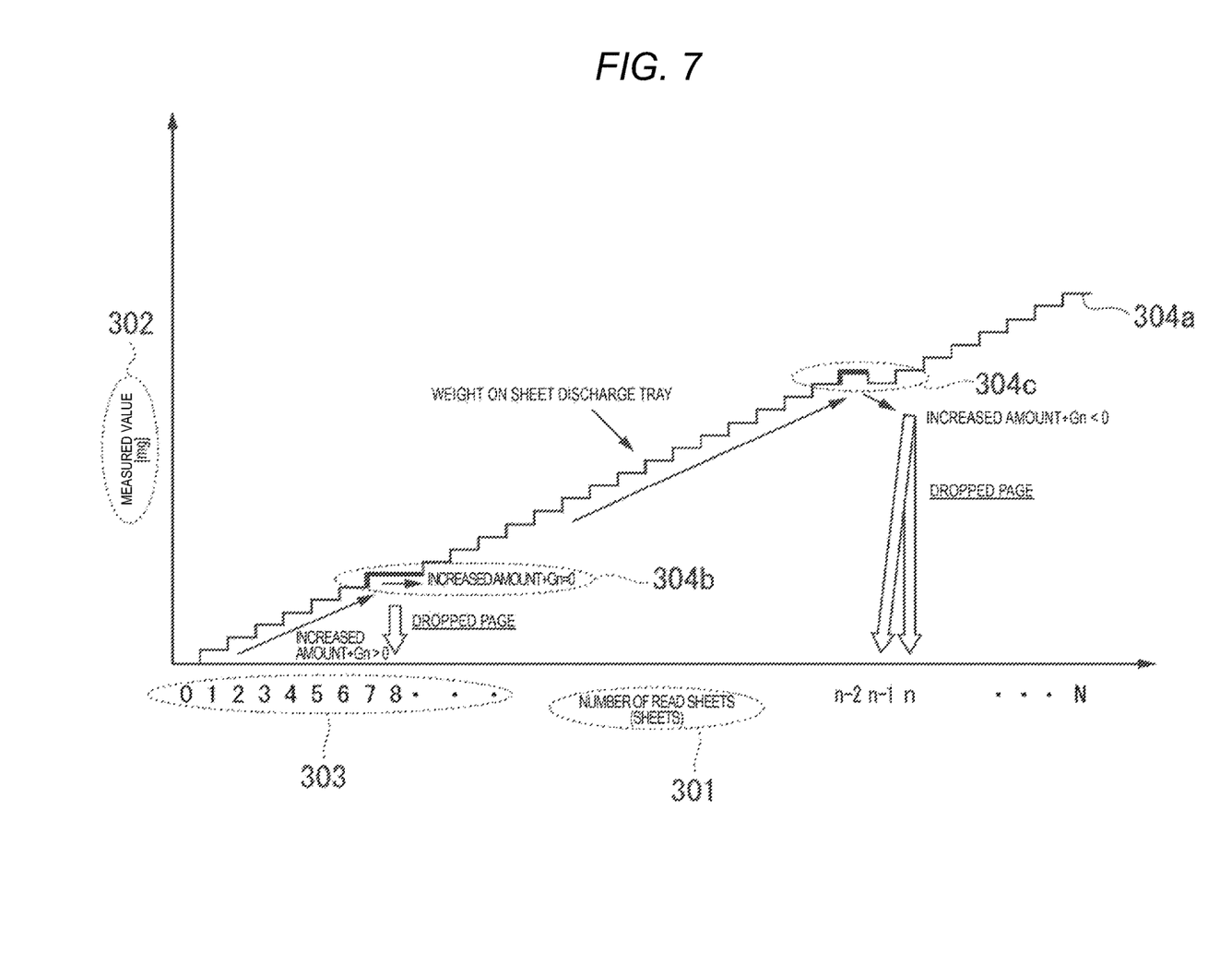
FIG. 7 is a diagram showing a change in weight when a sheet is dropped from a sheet discharge tray during the scanning.

FIG. 7 is a diagram showing a change in weight when a sheet drops from a sheet discharge tray of the embodiment during the scanning. A graph of FIG. 7 includes the region 301, the region 302, the region 303, and a region 304a. Since the region 301, the region 302, and the region 303 indicate the same content as those of the FIG. 5, the description is omitted. The region 304a is a line indicating a relationship between the number of read sheets (sheets) and the corresponding measured value [mg]. The region 304a includes a region 304b and a region 304c.

The region 304b indicates a change of weight when the read sheet is dropped from the sheet discharge tray. Specifically, the region 304b indicates reading of seventh and eighth sheets in the number of read sheets. In the region 304b, although the number of read sheets (sheets) is increased, there is no change in the measured value [mg]. According to, it is determined that the read sheet is dropped from the sheet discharge tray. In addition, according to the number of sheets scanned in the region 303, it is understood that the dropped sheet is the eighth page. The region 304c indicates a change of weight when a sheet already on the sheet discharge tray is also dropped together with the read sheet. Specifically, the region 304c indicates the (n−2)th, (n−1)th, and nth read sheets in the number of read sheets. In the region 304c, although the number of read sheets in the (n−1)th and nth read sheets in the number of read sheets is increased, the measured value [mg] is decreased. Accordingly, it is determined that the sheet already on the sheet discharge tray is dropped from the sheet discharge tray together with the read sheet. According to the region 304c, since the measured value after reading the nth read sheet is the same as the measured value after reading the (n−2)th read sheet, it is understood that the nth and (n−1)th sheets are dropped.

Figure 8:
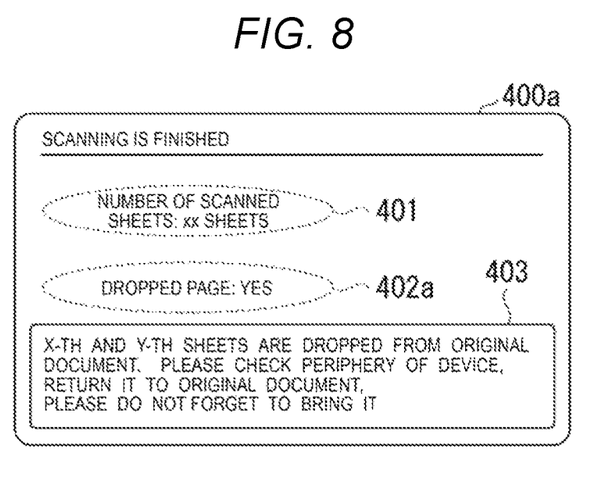
FIG. 8 is an example of an image displayed on a display after scanning when the sheet is dropped during the scanning.

FIG. 8 is a diagram showing one specific example the dropped page screen displayed on a display after scanning when at least one sheet is dropped during the scanning of the embodiment. A region 400a indicates an image displayed on the display 110. The region 400a includes the region 401, a region 402a, and a region 403. Since the region 401 and the region 402a indicate the same content as those of FIG. 6, the description is omitted. The page of the sheet (s) dropped during the scanning is indicated on the region 403. The page of the dropped sheet is the dropped page stored in the dropped page storage unit 102.

By adopting such a configuration, the measured value comparison unit 152 determines whether or not the read sheet is dropped from the sheet discharge tray by comparing the current measured value measured by the measurement unit 103 and the previous measured value stored in the measured value storage unit. According to a comparison result, the dropped page identification unit 153 identifies the number of dropped sheets, and stores the number of the dropped page in the dropped page storage unit 102. After finishing the scanning, the dropped page that is stored is displayed on the display 110. Accordingly, by looking at the display 110, users can identify the dropped page during the scanning.

In the above-described embodiment, it is described in detail that the sheet is dropped from the sheet discharge tray during the scanning. However, for other functions such as copy and print, the measurement unit 103 may be attached to the sheet discharge tray on which the sheet after forming an image is discharged. According to such a configuration, for the sheet discharge tray to which the sheet on which an image is formed is discharged, it is possible to identify a dropped sheet. Accordingly, users can identify the page dropped during the image formation, and can prevent the sheet from being lost.

The dropped page identification unit 153 may be configured to count the total number of dropped pages, in addition to counting the number of sheets dropped after already being placed on the sheet discharge tray, together with the read sheet. According to such a configuration, users can quickly identify the number of the dropped sheets, and can prevent the sheet from being lost.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sheet processing apparatus comprising:
   an image reading unit configured to read an image of a sheet;
   a sheet discharge tray configured to receive a sheet read by the image reading unit;
   a measurement unit configured to measure a total weight of one or more sheets on the sheet discharge tray;
   a storage unit; and
   a processor programmed to function as:
      a read counter configured to, for each currently read sheet, count a number of all sheets, including the currently read sheet, read by the image reading unit in a scanning job, and store in the storage unit the number of the currently read sheet in association with the measured total weight of the sheets, including the currently read sheet by the image reading unit, on the sheet discharge tray,
      a measured value comparison unit configured to compare the measured total weight of the sheets on the sheet discharge tray and a stored measured weight stored in association with the number of the read sheet immediately preceding the currently read sheet, and
      a dropped page identification unit configured to identify, by page number, one or more sheets dropped from the sheet discharge unit based on the comparison result.

2. The apparatus according to claim 1, wherein, if the measured total weight is determined to be less than or equal to the stored measured weight, the dropped page identification unit identifies at least the currently read sheet as the dropped sheet.

3. The apparatus according to claim 2, wherein:
   if the measured total weight is determined to be equal to the stored measured weight, the dropped page identification unit identifies the currently read sheet as the dropped sheet, and
   if the compared measured total weight is determined to be less than the stored measured weight, the dropped page identification unit identifies at least the currently read sheet and the read sheet immediately preceding the currently read sheet as the dropped sheets.

4. The apparatus according to claim 3, wherein,
   if the compared measured total weight is determined to be less than the stored measured weight, the measured value comparison unit compares the measured total weight and a stored measured weight stored in association with the number of a next preceding read sheet that was read before the immediately preceding read sheet, and
   if the compared measured total weight is determined to be less than the stored measured weight stored in association with the number of the next preceding read sheet, the dropped page identification unit identifies the currently read sheet, the read sheet immediately preceding the current read sheet, and the next preceding read sheet as the dropped sheets.

5. The apparatus according to claim 2, further comprising:
   a display, wherein
   the processor is configured to control the display to display a dropped page screen identifying the dropped sheets identified by the dropped page identification unit, if all the sheets in the scanning job are read and if the dropped page identification unit identifies at least one dropped sheet.

6. The apparatus according to claim 1, wherein, if the measured total weight is determined to be greater than the stored measured weight, the dropped page identification unit does not identify a dropped sheet.

7. The apparatus according to claim 6, further comprising:
a display, wherein
the processor is configured to control the display to display a read finish screen indicating there were no dropped sheets in the scanning job, if all the sheets in the scanning job are read and if the dropped page identification unit does not identify a dropped sheet.

8. A sheet processing apparatus comprising:
a sheet discharge tray configured to receive discharged sheets;
a measurement unit configured to measure a total weight of one or more sheets on the sheet discharge tray;
a storage unit; and
a processor programmed to function as:
  a read counter configured to, for each currently discharged sheet, count a number of all sheets on the sheet discharge tray, and store in the storage unit the number of the currently discharged sheet in association with the measured total weight of the sheets, including the currently discharged sheet, on the sheet discharge tray,
  a measured value comparison unit configured to compare the measured total weight of the sheets on the sheet discharge tray and a stored measured weight stored in association with the number of the sheet discharged to the sheet discharge tray immediately preceding the currently discharged sheet, and
  a dropped page identification unit configured to identify, by page number, one or more sheets dropped from the sheet discharge unit based on the comparison result.

9. The apparatus according to claim 8, wherein, if the measured total weight is determined to be less than or equal to the stored measured weight, the dropped page identification unit identifies at least the currently discharged sheet as the dropped sheet.

10. The apparatus according to claim 9, wherein:
if the measured total weight is determined to be the same as the stored measured weight, the dropped page identification unit identifies the currently discharged sheet as the dropped sheet, and
if the measured total weight is determined to be less than the stored measured weight, the dropped page identification unit identifies at least the currently discharged sheet and the sheet discharged immediately preceding the currently discharged sheet as the dropped sheets.

11. The apparatus according to claim 10, wherein,
if the measured total weight is determined to be less than the stored measured weight, the measured value comparison unit compares the measured total weight and a stored measured weight stored in association with the number of the next preceding discharged sheet that was read before the immediately preceding read sheet, and
if the compared current measured weight is determined to be less than the stored measured weight stored in association with the number of the next preceding read sheet, the dropped page identification unit identifies the currently discharged sheet, the sheet discharged immediately preceding the current read sheet, and the next preceding discharged sheet as the dropped sheets.

12. The apparatus according to claim 9, further comprising:
a display, wherein
the processor is configured to control the display to display a dropped page screen identifying the dropped sheets identified by the dropped page identification unit, if discharging of the sheets is complete and if the dropped page identification unit identifies at least one dropped sheet.

13. The apparatus according to claim 8, wherein, if the measured total weight is determined to be greater than the stored measured weight, the dropped page identification unit does not identify a dropped sheet.

14. The apparatus according to claim 13, further comprising:
a display, wherein
the processor is configured to control the display to display a process finish screen indicating there were no dropped sheets, if discharging of the sheets is complete and if the dropped page identification unit does not identify a dropped sheet.

15. The apparatus according to claim 8, wherein the sheets are discharged to the sheet discharge tray from one of a sheet reading apparatus and an image forming apparatus.

16. A sheet processing method comprising:
receiving, one by one, sheets on a sheet discharge tray;
for each currently discharged sheet:
  measuring a total weight of one or more sheets on the sheet discharge tray,
  counting a number of all sheets on the sheet discharge tray,
  storing the number of the currently discharged sheet in association with the measured total weight of the sheets, including the currently discharged sheet, on the sheet discharge tray, and
  comparing the measured total weight of the sheets on the sheet discharge tray and a stored measured weight stored in association with the number of the sheet discharged to the sheet discharge tray immediately preceding the currently discharged sheet; and
identifying, by page number, any sheets dropped from the sheet discharge unit based on the comparison result.

17. The method according to claim 16, wherein, if the measured total weight is determined to be less than or equal to the stored measured weight, at least the currently discharged sheet is identified as the dropped sheet.

18. The method according to claim 17, wherein:
if the measured total weight is determined to be the same as the stored measured weight, the currently discharged sheet is identified as the dropped sheet, and
if the compared measured total weight is determined to be less than the stored measured weight, at least the currently discharged sheet and the sheet discharged immediately preceding the currently discharged sheet are identified as the dropped sheets.

19. The method according to claim 16, further comprising:
displaying one of:
  a dropped page screen identifying the dropped sheets identified by the dropped page identification unit, if discharging of the sheets is complete and if at least one dropped sheet is identified, and
  a process finish screen indicating there were no dropped sheets, if discharging of the sheets is complete and if no dropped sheets are identified.

20. The method according to claim 16, wherein the sheets are discharged to the sheet discharge tray from one of a sheet reading apparatus and an image forming apparatus.

* * * * *